April 22, 1952  P. A. DELL  2,593,854
GLASS TUBE BENDING APPARATUS
Filed April 10, 1951  2 SHEETS—SHEET 2
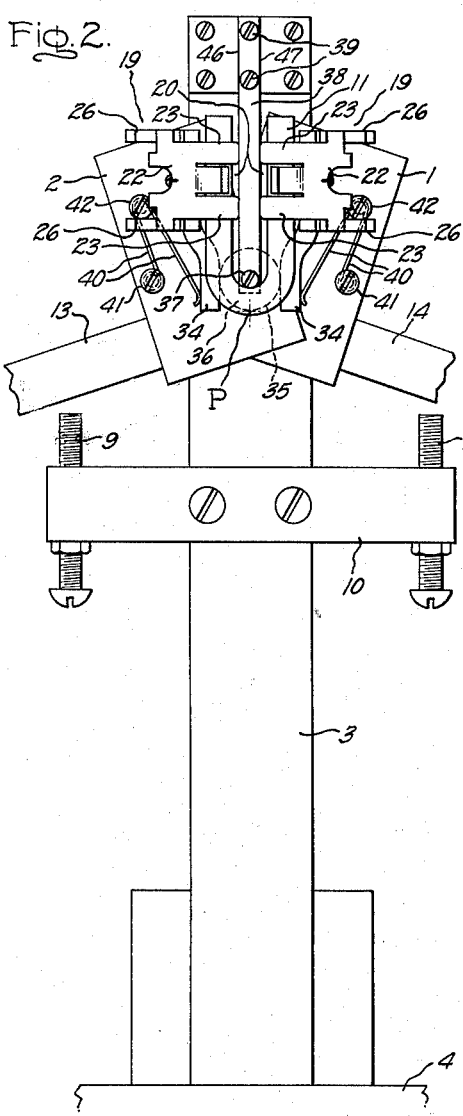
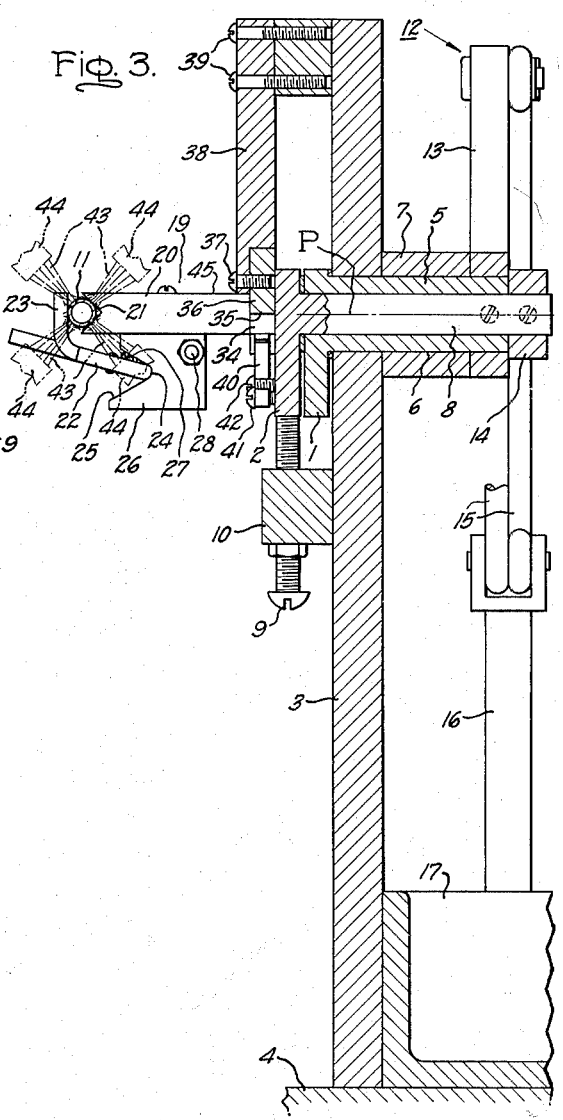
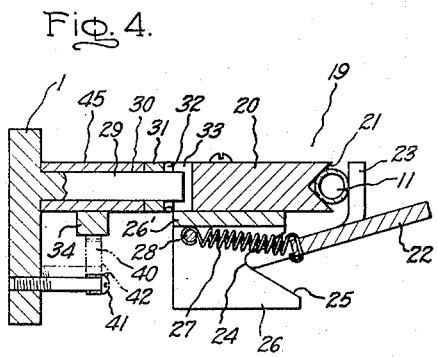
Inventor:
Paul A. Dell,
by Vernet C. Kauffman
His Attorney.

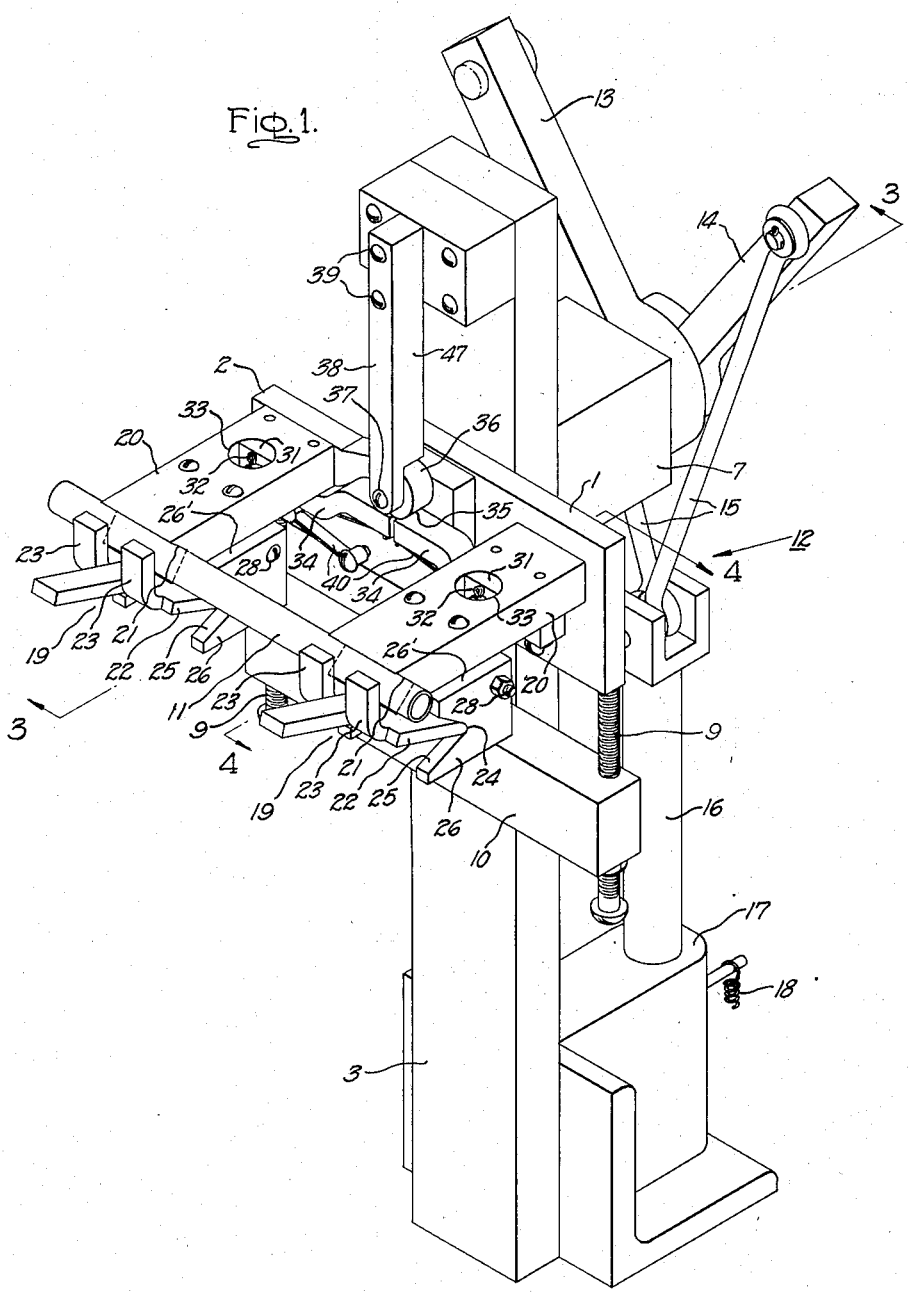

UNITED STATES PATENT OFFICE 2,593,854

GLASS TUBE BENDING APPARATUS

Paul A. Dell, Highland Heights, Ohio, assignor to General Electric Company, a corporation of New York Application April 10, 1951, Serial No. 220,148

5 Claims. (Cl. 49—7)

My invention relates to apparatus for bending glass tubing and more particularly to apparatus for forming an angular bend in a glass tube. The apparatus is particularly useful in the formation of U-shaped glass tubes such as are used to form the envelopes of certain types of electric discharge devices, such as repeating flash tubes, for instance.

The bending of glass tubes into U shape, when performed by hand, ordinarily requires the services of a highly skilled glass worker. This is particularly true where it is desired to obtain U tubes of uniform final shape. Such hand bending of glass tubes, however, besides being slow and difficult is also a costly operation. While bending machines have heretofore been employed for such purpose, they have been for the most part rather complicated and, in addition, have been capable of forming U tubes of only a single given center-to-center leg spacing.

It is an object of my invention, therefore, to provide apparatus for forming an angular bend in glass tubes and the like by means of which such tubes may be quickly, easily and accurately bent into uniform shape without undue stretching of the glass and collapsing or flattening of the tubes at the point of bend.

Another object of my invention is to provide apparatus simple in construction and effective in operation for bending glass tubes into uniform U shape, which apparatus is simple to operate and is capable of forming glass U tubes with different center-to-center leg spacings.

In accordance with the invention, the glass tube-bending apparatus comprises a pair of swing arms pivoted about a common horizontal pivot axis to swing upward toward each other and bend a heated glass tube carried thereby, each of said swing arms carrying a tube holder for gripping the glass tube to be bent and holding it in a horizontal position with its axis transverse to and passing through or slightly above the common pivot axis of the swing arms, the holders being rotatably mounted on their respective swing arms to rotate about axes parallel to the common pivot axis of the swing arms and being rotated in the same direction as the pivotal movement of the swing arms, during the swing movement of the latter to bend the tube, by means of cam follower arms which are carried by the said tube holders and which bear against and ride on a fixed central cam mounted on the frame of the apparatus.

Further objects and advantages of my invention will appear from the following description of a species thereof and from the accompanying drawing in which:

Fig. 1 is a perspective view of a glass tube-bending apparatus comprising my invention with the parts shown in their normal starting position; Fig. 2 is a fragmentary front elevation thereof with the parts shown in position at the completion of the bending operation; Fig. 3 is a vertical section on the line 3—3 of Fig. 1; and Fig. 4 is a fragmentary sectional view through one of the tube holders of the apparatus.

Referring to the drawing, the apparatus there shown comprises a pair of swing arms 1, 2 pivotally mounted on a support bracket 3 fastened to and upstanding from a table portion 4 of a bench or stand. The bracket 3 constitutes the frame of the machine. The swing arms 1, 2 are mounted to pivot about a common horizontal axis P (Fig. 2), for which purpose arm 1 is provided with a hollow shaft extension or sleeve 5 (Fig. 3) which is journalled in a bearing opening 6 formed partly in the bracket proper 3 and partly in a bearing block 7 fastened to the rear side of the bracket 3. The other arm 2 is provided with a shaft extension 8 which is journalled in the hollow shaft 5 of arm 1. As shown in Fig. 1, the swing arms 1, 2 are normally supported in positions extending horizontally away from each other by the engagement of the arms with the upper ends of stop screws 9 carried by a plate 10 fastened to the bracket 3.

The swing arms 1, 2 are swung upwardly, to effect the bending of the glass tube 11 carried thereby, by suitable actuating means 12 comprising, in the particular case shown, separate actuating arms 13 and 14 fastened to the rear ends of the respective shaft extensions 5, 8 of the swing arms and connected at their outer ends by links 15, to the upper end of a vertically extending actuating rod 16. The said actuating rod 16 is vertically reciprocable in a bearing 17 fastened to the rear side of the bracket 3, and it is connected at its lower end to a foot pedal (not shown). A tension coil spring 18 (Fig. 1), connected at its opposite ends to the bearing 17 and to the actuating rod 16, acts to continuously urge the latter upwardly so as to return the swing arms 1, 2 to their normal horizontally extending starting position.

Adjacent their outer or free ends, the swing arms 1, 2 each carry a tube holder 19 on their front sides for gripping and holding the glass tube 11 which is to be bent. The holders 19 each comprise a V block 20 mounted on and projecting from the front side of the respective swing arm 1 or 2 and provided at its front end with a V-shaped groove or notch 21 for receiving and supporting the glass tube 11, the V grooves 21 of the two holders 19 on the swing arms 1, 2 being horizontally aligned with one another when the swing arms are in their normal starting position and being so located relative to the common pivot center P of the swing arms as to hold the glass tube 11 with its axis extending horizontally either through or slightly above the said pivot center P of the swing arms. The glass tube 11 is held in place within the V grooves 21 by means of spring-held clamp means in the form of pivotally mounted toggle arms 22 having bent up finger portions 23 which engage and clamp the tube 11 in the V grooves 21. As shown in Fig. 4, the toggle clamp arms 22 of each holder 19 are pivotally seated against the rounded bottoms 24 of V notches 25 formed in the two depending side plate portions 26 of a U-shaped bracket member 26' fastened to and depending from the respective holder blocks 20, the toggle arms 22 being continuously held seated against the rounded bottoms 24 of the V notches 25 by a tension coil spring 27 which is connected at its opposite ends to the toggle arm 22 and to a spring post 28 carried by the depending side plate portions 26 of the U-shaped bracket 26'. The coil spring 27 is so arranged as to shift its pull to opposite sides of the pivot center of the toggle arm 22 when the latter is pivoted, so as to maintain the toggle arm either in its opened position for permitting insertion of the glass tube 11 in place in the holders 19, or in its closed position for clamping the glass tube 11 in place in the holders 19.

With previous type bending machines for bending glass tubes into U shape, the glass tubes, at the start of the bending operation, were generally held in fixed holders on the swing arms in a horizontal position offset downwardly from the common pivot center of the two swing arms carrying the tube. With such construction, therefore, the glass tube, being clamped in place to the two fixed holders on the swing arms at points on opposite sides of the bend to be formed in the tube, was subjected to an appreciable stretching of the glass at the bend which therefore caused a thinning-out of the glass such as resulted in the flattening of the tube at the bend as well as the weakening and frequent breakage of the tube at such point. One way of overcoming this difficulty is the employment of tube holders which are movably mounted on the swing arms for movement inwardly toward each other so as to locally thicken the glass tube at the region of the bend prior to the formation of the bend. Such arrangements, however, result in a more complicated bending machine construction and, in addition, require the exercise of a greater degree of skill on the part of the operator manipulating the machine.

In accordance with the invention, such undue stretching of the glass during the bending operation is avoided, and simplicity of machine construction and operation is obtained, by mounting the glass tube in the holders 19 so that its axis either passes through or lies slightly above the common pivot center P of the swing arms 1, 2, and by rotatably mounting the tube holders 19 on their respective swing arms 1, 2 for rotation about axes parallel to the common pivot axis P of the swing arms so that the holders can be rotated in the same direction, i. e., clockwise or counterclockwise, as their respective swing arms 1 and 2 (during the upward swinging movement of the latter) and into positions wherein their tube-holding V grooves 21 extend vertically downward and parallel to each other at the end of the bending operation, thereby to effect the desired spacing and parallelism between the two legs of the finished bent U tube. For such purpose, the swing arms 1, 2 are provided with studs or pivot pins 29 (Fig. 4) which project from their front sides and on which the tube holder blocks 20 are rotatably supported, the blocks 20 being provided with corresponding bearing openings 30 in which the pivot pins 29 are received. The holder blocks 20 are suitably retained in place on the pivot pins 29, as by means of retaining washers 31 and cotter pins 32 which are located on the front ends of the pivot pins 29 within cross openings 33 in the holder blocks 20.

The desired rotational movement of the tube holders 19 relative to their respective swing arms 1, 2 during the upward swinging movement of the latter is imparted to the holders by means of cam follower arms 34 which are carried by the holder blocks 20 and project inwardly toward each other and which bear against and ride on the downwardly facing cam surface 35 of a stationary cam 36 mounted on the machine frame 3 in a position immediately in front of the swing arms 1, 2 and offset slightly above the common pivot axis P thereof. The cam surface 35 is preferably made of substantially semi-circular shape, as shown, so as to cause the tube holders 19 to rotate at an approximately uniform rate during the upward swing movement of the swing arms 1, 2. The cam 36 may be conveniently formed by a circular disc which is fastened by means of a screw 37 to the lower end of a vertically extending support bar 38 which is, in turn, suitably fastened at its upper end to the support bracket or frame 3 of the machine, as by screws 39. The cam follower arms 34 are constantly spring-pressed against and held in engagement with the cam 36 by hairpin springs 40, one leg of each spring 40 being suitably fastened to the respective swing arms 1, 2, as by mounting screws 41, 42, and the other leg being free and bearing at its end against the associated cam follower arm 34.

In the operation of the bending apparatus according to the invention to bend a straight glass tube 11 into U shape, the glass tube is first mounted in proper bending position in the tube holders 19, the tube being centered between the holders and being clamped therein by the spring-pressed clamps 22. The mid-portion of the glass tube located between the holders 19 is then suitably heated to a softened, pliable state ready for bending by gas fires 43 (Fig. 3) directed against the tube from a group of burners 44 which may be suitably mounted on the table 4 for swinging movement into and out of operative heating position wherein the are arranged about the tube in a manner such as shown in Fig. 3. When the glass of the tube 11 has attained the desired temperature and pliable condition, the burners 44 are swung out of the way and the actuating means 12 then operated, by depression of the foot pedal connected to the actuating rod 16, to thereby swing the two swing arms 1, 2 upwardly and thus bend the glass tube 11 at the mid point thereof. During the upward swinging movement of the swing arms 1, 2, the cam follower arms 34 ride around the cam 36 and rotate the tube holders 19 in the same direction as their respective swing arms so as to maintain the two legs of the tube separated during the bending operation and position them in parallelism with each other at the completion of the bending operation. The upward swinging movement of the two swing arms 1, 2 is continued until the upper sides 45 of the two holder blocks 20 abut against the opposite sides 46, 47 of the cam support bar 38 to complete the bending operation, at which time the holder blocks 20 will have been rotated by the cam follower arms 34 into their vertically down position as shown in Fig. 2 so as to position the two legs of the bent U tube in vertical parallelism with each other, as shown.

Inasmuch as the limit of the upward swinging movement of the swing arms 1, 2 is determined by the abutting engagement of the holder blocks 20 with the cam support bar 38, the final spacing of the two legs of the finished glass U tube is therefore determined by the thickness of the cam support bar 38 plus the thickness of the upper portions of the two holder blocks 20 above the pivot centers of their respective pivot pins 29. It will be apparent, therefore, that by simply changing the width of the cam support bar 38, with a corresponding change in the diameter of the cam 36 and a compensating change in the length of the cam support bar 38, it is possible to form U tubes of various center-to-center leg spacings.

Although a preferred embodiment of my invention has been disclosed, it will be understood that the invention is not to be limited to the specific construction and arrangement of parts shown, but that they may be widely modified within the spirit and scope of my invention as defined by the appended claims.

What I claim as new and desire to secure by Letters Patent of the United States is:

1. Glass tube bending apparatus comprising a support member, a pair of swing arms pivotally mounted on said support member to swing about a common horizontal pivot axis, said arms normally extending horizontally and oppositely away from each other, a pair of holders mounted one on each of said swing arms for gripping a glass tube and supporting it in a horizontal position extending transverse to and at least at the same elevation as the common pivot axis of said swing arms, means for heating and softening a zone of the tube adjacent the pivot axis of said arms, said holders being rotatably mounted on their respective swing arms for rotation about axes parallel to the common pivot axis of said swing arms, and means coacting with said holders to rotate them relative to and in the same direction as the swing movement of their respective swing arms during upward swinging movement of the latter to bend the glass tube.

2. Glass tube bending apparatus comprising a support member, a pair of swing arms pivotally mounted on said support member to swing about a common horizontal pivot axis, said arms normally extending horizontally and oppositely away from each other, actuating means operatively connected to said swing arms to swing them upwardly in unison, a pair of holders mounted one on each of said swing arms for gripping a glass tube and supporting it in a horizontal position extending transverse to and at least at the same elevation as the common pivot axis of said swing arms, means for heating and softening a zone of the tube adjacent the pivot axis of said arms, said holders being rotatably mounted on their respective swing arms for rotation about axes parallel to the common pivot axis of said swing arms, and cam means coacting with said holders to rotate them relative to and in the same direction as the swing movement of their respective swing arms during upward swinging movement of the latter by said actuating means to bend the glass tube.

3. Glass tube bending apparatus comprising a support member, a pair of swing arms pivotally mounted on said support member to swing about a common horizontal pivot axis, said arms normally extending horizontally and oppositely away from each other, a pair of holders mounted one on each of said swing arms for gripping a glass tube and supporting it in a horizontal position extending transverse to and at least at the same elevation as the common pivot axis of said swing arms, means for heating and softening a zone of the tube adjacent the pivot axis of said arms, said holders being rotatably mounted on their respective swing arms for rotation about axes parallel to the common pivot axis of said swing arms, and holder rotating means coacting with said holders to rotate them relative to and in the same direction as the swing movement of their respective swing arms during upward swing movement of the latter to bend the glass tube, said holder rotating means comprising a substantially semi-circular shaped cam mounted on said support member in a vertically disposed position approximately centrally between said holders and cam follower arms carried by said holders and engaging and riding on said semi-circular cam during the swing movement of said arms.

4. Glass tube bending apparatus comprising a support member, a pair of swing arms pivotally mounted on said support member to swing about a common horizontal pivot axis, said arms normally extending horizontally and oppositely away from each other, actuating means operatively connected to said swing arms to swing them upwardly in unison, a pair of holders mounted one on each of said swing arms for gripping a glass tube and supporting it in a horizontal position extending transverse to and at least at the same elevation as the common pivot axis of said swing arms, means for heating and softening a zone of the tube adjacent the pivot axis of said arms, said holders being rotatably mounted on their respective swing arms for rotation about axes parallel to the common pivot axis of said swing arms, and holder rotating means coacting with said holders to rotate them relative to and in the same direction as the swing movement of their respective swing arms during upward swing movement of the latter by said actuating means to bend the glass tube, said holder rotating means comprising a substantially semi-circular shaped cam mounted on said support member in a vertically disposed position approximately centrally between said holders, cam follower arms carried by said holders and adapted to engage and ride on said cam during the swing movement of said arms, and spring means coacting with said holders to exert pressure thereon tending to rotate them about their respective pivots in a direction to continuously press and hold their said cam follower arms against the said cam during the swing movement of said swing arms.

5. Glass tube bending apparatus comprising a support member, a pair of swing arms pivotally mounted on said support member to swing about a common horizontal pivot axis, said arms normally extending horizontally and oppositely away from each other, actuating means operatively connected to said swing arms to swing them upwardly in unison, stop means coacting with said swing arms to limit the upward swing movement thereof to a predetermined angular degree, a pair of holders mounted one on each of said swing arms for gripping a glass tube and supporting it in a horizontal position extending transverse to and at least at the same elevation as the common pivot axis of said swing arms, means for heating and softening a zone of the tube adjacent the pivot axis of said arms, said holders being rotatably mounted on their respective swing arms for rotation about axes parallel to the common pivot axis of said swing arms, and cam means coacting with said holders to rotate them in the same direction as the swing movement of their respective swing arms during upward swing movement of the latter and into a position in which the portions of the tube gripped by said holders are disposed vertically when the swing arms have been swung to their upward limiting position as determined by said stop means.

PAUL A. DELL.

No references cited.